(12) United States Patent
Wentink

(10) Patent No.: US 8,488,550 B2
(45) Date of Patent: *Jul. 16, 2013

(54) SYMMETRIC TRANSMIT OPPORTUNITY (TXOP) TRUNCATION

(75) Inventor: Menzo Wentink, Ultrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,654

(22) Filed: Aug. 22, 2012

(65) Prior Publication Data

US 2012/0307790 A1    Dec. 6, 2012

Related U.S. Application Data

(60) Continuation of application No. 13/251,772, filed on Oct. 3, 2011, now Pat. No. 8,270,385, which is a division of application No. 11/651,879, filed on Jan. 10, 2007, now Pat. No. 8,031,661, and a continuation-in-part of application No. 11/557,516, filed on Nov. 8, 2006.

(60) Provisional application No. 60/757,827, filed on Jan. 10, 2006, provisional application No. 60/735,024, filed on Nov. 8, 2005, provisional application No. 60/758,595, filed on Jan. 11, 2006.

(51) Int. Cl.
*H04W 4/00* (2009.01)

(52) U.S. Cl.
USPC ............ 370/329; 370/336; 370/331; 370/252

(58) Field of Classification Search
USPC ... 370/328–338, 252, 229–240; 455/450–454
See application file for complete search history.

(56) References Cited

U.S. PATENT DOCUMENTS

| | | | |
|---|---|---|---|
| 7,054,296 B1 * | 5/2006 | Sorrells et al. | 370/338 |
| 7,164,671 B2 * | 1/2007 | del Prado et al. | 370/338 |
| 7,251,232 B1 * | 7/2007 | Meier | 370/338 |
| 7,698,550 B2 * | 4/2010 | Abhishek et al. | 713/160 |
| 2002/0163933 A1 * | 11/2002 | Benveniste | 370/465 |
| 2003/0112780 A1 | 6/2003 | Ouyang et al. | |
| 2003/0123405 A1 * | 7/2003 | del Prado et al. | 370/331 |
| 2003/0161340 A1 * | 8/2003 | Sherman | 370/445 |
| 2003/0174690 A1 | 9/2003 | Benveniste | |
| 2004/0143681 A1 | 7/2004 | Benveniste | |

(Continued)

FOREIGN PATENT DOCUMENTS

| | | |
|---|---|---|
| EP | 1 351 414 | 10/2003 |
| EP | 1 429 494 | 6/2004 |

(Continued)

OTHER PUBLICATIONS

ANSI/IEEE Std 802.11, 1999 Edition (R2003), 528 pages.

(Continued)

*Primary Examiner* — Kashif Siddiqui

(57) ABSTRACT

Various embodiments of symmetric transmit opportunity (TXOP) truncation (STT) systems and methods are disclosed. One method embodiment, among others, comprises receiving a frame that truncates a TXOP around a first station, and responsive to receiving the frame, sending a second frame that truncates the TXOP around a second station. Others system and method embodiments are disclosed.

20 Claims, 16 Drawing Sheets

U.S. PATENT DOCUMENTS

| | | | |
|---|---|---|---|
| 2004/0181597 A1 | 9/2004 | Ekl et al. | |
| 2005/0068900 A1 | 3/2005 | Stephens et al. | |
| 2005/0135295 A1* | 6/2005 | Walton et al. | 370/328 |
| 2005/0238016 A1* | 10/2005 | Nishibayashi et al. | 370/389 |
| 2005/0281225 A1* | 12/2005 | Mishra et al. | 370/329 |
| 2006/0034219 A1* | 2/2006 | Gu et al. | 370/329 |
| 2006/0245369 A1* | 11/2006 | Schimmelpfeng et al. | 370/252 |
| 2007/0008922 A1* | 1/2007 | Abhishek et al. | 370/329 |
| 2007/0014237 A1* | 1/2007 | Nishibayashi et al. | 370/229 |
| 2007/0054632 A1* | 3/2007 | Lu et al. | 455/101 |
| 2007/0160021 A1* | 7/2007 | Xhafa et al. | 370/338 |
| 2007/0171858 A1* | 7/2007 | Grandhi et al. | 370/328 |
| 2007/0217352 A1* | 9/2007 | Kwon | 370/312 |
| 2009/0310619 A1* | 12/2009 | Brommer | 370/449 |

FOREIGN PATENT DOCUMENTS

| | | |
|---|---|---|
| JP | 2001-339391 | 12/2001 |
| JP | 2003-008587 | 1/2003 |
| JP | 2008-549533 | 6/2009 |
| WO | WO-2005/039105 | 4/2005 |
| WO | WO-2007/056747 | 5/2007 |
| WO | WO-2007/081683 | 7/2007 |

OTHER PUBLICATIONS

Decision for Patent on Korean Patent 10-2008-7019378, mailed Sep. 18, 2012.

Extended European Search Report for EP Application 07710033.7, dated Jul. 3, 2012.

Extended Search Report issued on EP Application 06839768.6, dated Apr. 25, 2012.

Final Office Action on U.S. Appl. No. 11/651,879, mailed Dec. 8, 2010.

Final Office Action on U.S. Appl. No. 11/557,516, mailed Jan. 12, 2011.

Final Office Action on U.S. Appl. No. 11/557,516, mailed Nov. 6, 2009.

Final Office Action on U.S. Appl. No. 11/651,879, mailed Dec. 29, 2009.

Fischer, Michael, "QoS Baseline Proposal," IEEE 802.11 Standards Committee, Document IEEE 802.11-00/360R1, Nov. 7, 2000, 73 pages.

International Preliminary Report on Patentability for PCT/US2006/060663, issued May 14, 2008.

International Preliminary Examination Report for PCT/US06/60663, completed Jun. 18, 2009.

International Search Report for PCT/US07/60320, dated Oct. 26, 2007.

Non-Final Office Action on U.S. Appl. No. 13/251,772, mailed Feb. 15, 2012.

Non-Final Office Action on U.S. Appl. No. 11/557,516, mailed Apr. 28, 2009.

Non-Final Office Action on U.S. Appl. No. 11/557,516, mailed May 13, 2010.

Non-final Office Action on U.S. Appl. No. 11/651,879, mailed Aug. 4, 2010.

Non-Final Office Action on U.S. Appl. No. 11/651,879, mailed Jun. 18, 2009.

Notice of Allowance on U.S. Appl. No. 13/251,772, mailed Jun. 4, 2012.

Notice of Allowance on U.S. Appl. No. 11/651,879, mailed Jun. 9, 2011.

Notice of Allowance on U.S. Appl. No. 11/557,516, mailed Aug. 16, 2012.

Office Action issued on Japanese Application 2008-550486, mailed Mar. 13, 2012 (English translation not available).

Office Action on U.S. Appl. No. 11/557,516, mailed May 13, 2010.

* cited by examiner

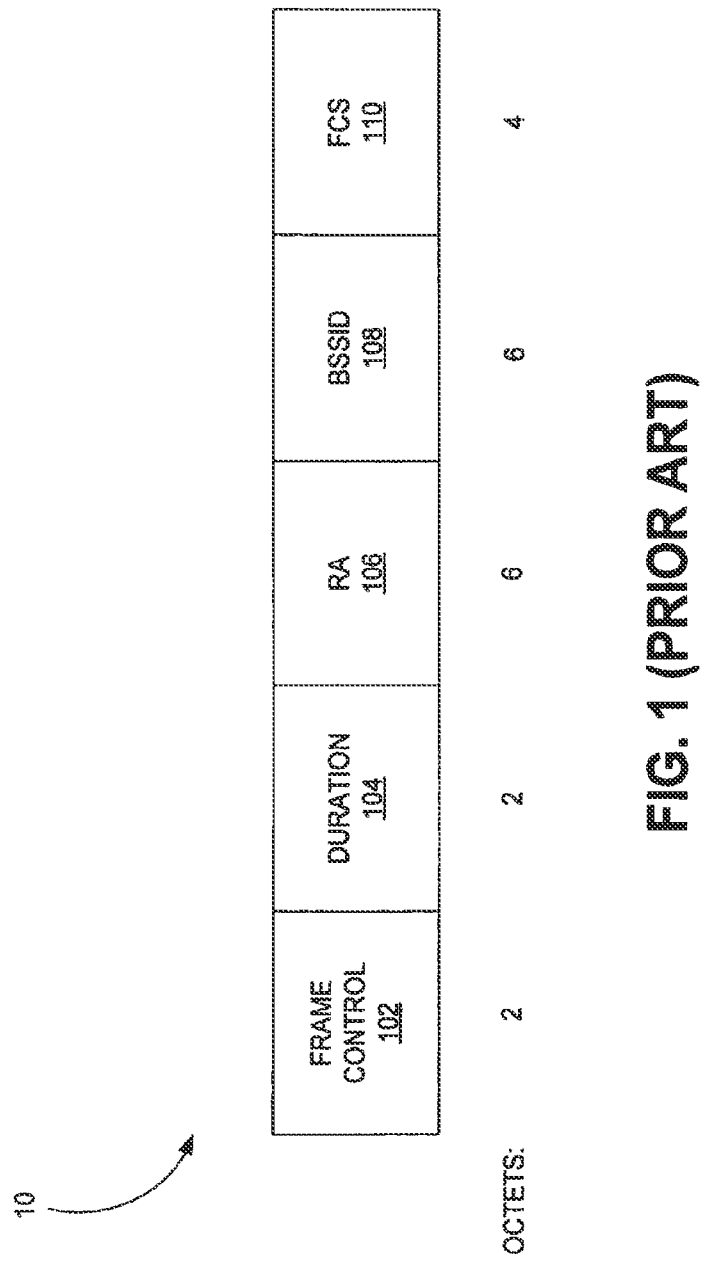

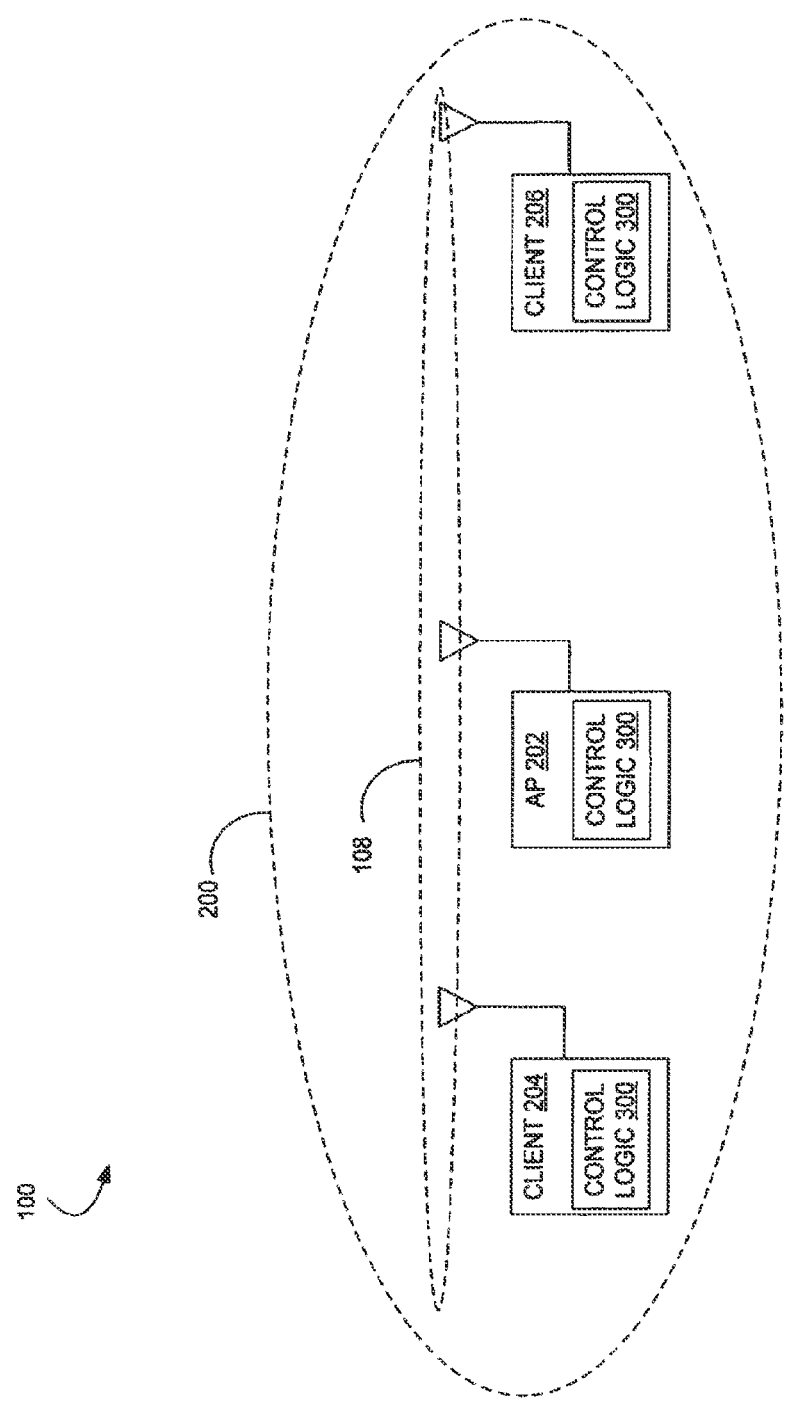

SYMMETRIC TRANSMIT OPPORTUNITY (TXOP) TRUNCATION

CROSS-REFERENCE TO RELATED PATENT APPLICATIONS

This application is a Continuation of U.S. application Ser. No. 13/251,772, filed Oct. 3, 2011, which is a Divisional of U.S. application Ser. No. 11/651,879, filed Jan. 10, 2007 (now U.S. Pat. No. 8,031,661), which claims the benefit of Provisional application U.S. Application 60/757,827, filed Jan. 10, 2006. U.S. application Ser. No. 11/651,879 is also a Continuation-In-Part of U.S. application Ser. No. 11/557,516, filed Nov. 8, 2006, which claims the benefit of Provisional application U.S. Application 60/735,024, filed Nov. 8, 2005, and Provisional application U.S. Application 60/758,595, filed Jan. 11, 2006, all of which are incorporated herein by reference in their entirety.

BACKGROUND OF THE INVENTION

1. Technical Field

The present disclosure is generally related to communication systems and methods and, more particularly, is related to collision avoidance systems and methods in wireless networks.

2. Related Art

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth® and IEEE 802.11, have been introduced to govern the development of wireless equipment for such localized networks.

A wireless local area network (LAN) typically uses infrared (IR) or radio frequency (RF) communication channels to communicate between portable or mobile computer terminals and access points (APs) or base stations. These APs are, in turn, connected by a wired or wireless communications channel to a network infrastructure which connects groups of access points together to form the LAN, including, optionally, one or more host computer systems.

Wireless protocols such as Bluetooth® and IEEE 802.11 support the logical interconnections of such portable roaming terminals having a variety of types of communication capabilities to host computers. The logical interconnections are based upon an infrastructure in which at least some of the terminals are capable of communicating with at least two of the APs when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. The IEEE 802.11 standard permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures. The IEEE Standard 802.11b extension supports data rates up to 11 Mbps.

The current 802.11 standard describes several methods to set a virtual carrier sense, referred to as a network allocation vector or NAV, most notably by request to send/clear to send (RTS/CTS) mechanisms. The sending of an RTS frame (herein, RTS frame also referred to as, simply, RTS) sets a NAV locally around the sender of the RTS, and the sending of a CTS frame (herein, CTS frame is also referred to as CTS) does the same locally around the sender of the CTS (e.g., the receiver of the RTS).

One problem that exists in current implementations under 802.11 involves what is referred to as a hidden node problem. For instance, in an infrastructure mode of a wireless LAN system, a first device may communicate frames to the AP and vice versa. Similarly, a second device may communicate frames to the AP, and vice versa. However, the second device may not detect transmissions from the first device (hence the phrase hidden node), for instance if the distance between the first and second device is too great. Because of the hidden node problem, various complications may arise in terms of collision avoidance and symmetry of response among devices, causing inequity in terms of opportunities for access to a shared medium of the communication system. For instance, in 802.11 compliant systems, the NAV can be reset by an access point (AP) through the transmission of what is commonly referred to as a CF-end frame. One exemplary frame format for a CF-end frame 10 is shown in FIG. 1, and comprises two octets (exemplary quantity of octets shown beneath the frame 10) corresponding to a frame control field 102, two octets corresponding to duration field 104, six octets corresponding to a receiver address (RA) field 106, which usually contains the Broadcast Address (BC), six octets corresponding to a basic service set identifier (BSSID) field 108, and four octets corresponding to a frame check sequence (FCS) field 110. When the distance between a client station and an AP is large, one possible effect is that the area where the CF-end frame 10 is not received will not reset the NAV, resulting in inequitable access as described above.

SUMMARY OF THE INVENTION

Embodiments of the present disclosure provide symmetric transmit opportunity (TXOP) truncation systems and methods in a wireless network. Briefly described, one embodiment of a method, among others, comprises receiving a frame that truncates a TXOP around a first station, and responsive to receiving the frame, sending a second frame that truncates the TXOP around a second station.

Another method embodiment, among others, comprises receiving a frame from an access point (AP) that includes an indicator of an end of a TXOP, responsive to receiving the indicator, sending a first frame that truncates the TXOP around a first station, receiving the first frame at the AP, and responsive to receiving the first frame at the AP, sending a second frame that truncates the TXOP around the AP.

Another method embodiment, among others, comprises sending at a first station a first frame, sending at the first station an extended interframe space (EIFS) set frame after the first frame, and sending at a second station a second frame having a completed transmission corresponding to time based on an interval of EIFS less DIFS, the interval commencing from an end of the short frame.

One system embodiment, among others, comprises a processor configured with logic to receive a frame that truncates a TXOP around a first station and, responsive to receiving the frame, the processor further configured with the logic to send a second frame that truncates the TXOP around a second station.

Another system embodiment, among others, comprises means for receiving a frame that truncates a TXOP around a first station, and responsive to receiving the frame, means for sending a second frame that truncates the TXOP around a second station.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a block diagram that illustrates one exemplary frame format for a CF-end frame.

FIG. 2 is a block diagram of an exemplary environment in which various embodiments of a symmetric transmit opportunity (TXOP) truncation (STT) system may be implemented.

DETAILED DESCRIPTION OF THE PREFERRED EMBODIMENTS

Figure 3A:
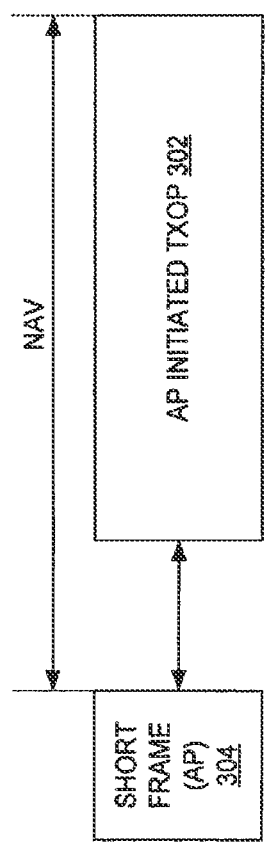
FIGS. 3A-3B are block diagrams of that illustrate extended interframe space (EIFS) avoidance aspects to embodiments of the STT system as shown in FIG. 2.

Disclosed herein are various embodiments of symmetric transmit opportunity (TXOP) truncation (STT) systems and corresponding mechanisms or methods in a wireless network (herein, individually or collectively referred to also as an STT system or STT systems). The STT systems described herein comprise functionality to truncate a TXOP in a symmetric manner in a plurality of devices. That is, in various STT systems and methods described herein, both access points (APs) and client stations (herein, clients) are also allowed to truncate their TXOPs by transmitting a CF-end frame. This truncation is referred to as a TXOP truncation, where a NAV is first set for some maximum duration of time (e.g., the TXOP limit) and then reset when no more traffic (e.g., of frames) is left and there is some NAV time that still remains. In general, a TXOP comprises a signal exchange which may begin with the transmission of a short frame such as an RTS or CTS and ends with the last frame sent or received by the sender of the short frame (e.g., sender of the RTS or CTS). The truncation at both clients and APs resolve the various problems resulting from a reset that is not symmetrical, such as in conventional systems where the reset comes from a single device (though set by both devices through the RTS/CTS mechanisms). Various embodiments of the STT systems provide one or more mechanisms for the symmetrical truncation of TXOPs.

Thus, although described mostly in the context of a wireless local area network (WLAN) environment having a basic service set (BSS) configured in an infrastructure mode, the various embodiments of the STT systems described herein may similarly be applied to other systems and environments, such as ad hoc systems (e.g., independent BSS (IBSS) systems) or DLC systems, as well as other communication system environments. Additionally, although IEEE 802.11 is prominently used herein as an example of a standard used in the disclosed exemplary wireless networks, the various systems and methods described herein may apply to virtually any wireless network. Further, some embodiments of the STT systems may include some or all of the functionality of collision avoidance systems (CA systems) described in the co-pending application having Ser. No. 11/557,516 and incorporated herein by reference in its entirety.

FIG. 2 shows an exemplary wireless LAN (WLAN) environment 100 in which various embodiments of a symmetric transmit opportunity (TXOP) truncation (STT) system 200 may be implemented. In general, the STT system 200 is configured as a basic service set (BSS), which comprises a plurality of stations or nodes, such as stations 202, 204, and 206. Each of the stations 202, 204, and 206 may be embodied as one of many wireless communication devices, including computers (desktop, portable, laptop, etc.), consumer electronic devices (e.g., multi-media players), compatible telecommunication devices, personal digital assistants (PDAs), or any other type of network devices such as printers, fax machines, scanners, hubs, switches, routers, set-top boxes, televisions with communication capability, etc.

The STT system 200 shown in FIG. 2 comprises, in one embodiment, an access point (AP) station 202 (herein, also referred to, simply, as an AP) and one or more client stations 204, 206 (herein, also referred to individually or collectively as client(s)). The STT system 200 is configured in what may be referred to as an infrastructure mode, whereby clients 204 and 206 communicate frames directly with the AP 202 and not with each other. However, the various embodiments of STT systems 200 are not limited to such arrangements, and in some embodiments, may be arranged in ad hoc or direct link communication configurations. Included within each of the AP 202 and clients 204, 206 is control logic 300. The control logic 300 implements MAC layer and PHY layer services. The MAC layer services provide the capability for a given station to exchange MAC frames. The MAC layer services provide management, control, or data frames for transmission between stations 202, 204, and 206. The 802.11 MAC layer services make use of at least three frame types (data, management, control), and within each type, various subtypes. For instance, request-to-send (RTS) frames, clear-to-send (CTS) frames, and CF-end frames are examples of control subtypes (e.g., control/CF-end refers to a control-type frame of the subtype, CF-end). After a station forms the applicable MAC frames, the frame bits are passed to the PHY layer for transmission. One skilled in the art can understand in the context of this disclosure that the control logic 300 can be configured using a plurality of modules (e.g., hardware and/or software), each with distinct functionality, or as a single module comprising a plurality of functionality.

The control logic 300 can be implemented in hardware, software, or a combination thereof. When implemented in whole or in part by software, control logic 300 is implemented in software stored in a memory that is executed by a suitable instruction execution system. When implemented in whole or in part by hardware, the control logic 300 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In one embodiment, the control logic 300 may include a PHY layer processor, MAC layer processor, or a combination of both (in the same or separate units), including, but not limited to, a digital signal processor (DSP), a microprocessor unit (MCU), a general purpose processor, and an application specific integrated circuit (ASIC), among others.

The AP 202 is typically connected to a wired network (e.g., Ethernet), not shown. In general, the clients, such as client 204, connect to the AP 202 through a scanning process. The scanning process can either be performed passively by listening for a beacon transmitted by one or more APs 202, or actively by sending out probes to one or more APs 202 and choosing an AP that provides the best connection (e.g., in terms of signal strength and/or bit error ratio (BER)). After an AP is chosen, such as AP 202, an authentication process occurs between the client 204 and the AP 202, and then association between the client 204 and the AP 202 may begin.

Association involves the communication between the clients 204, 206 and the AP 202 via a shared wireless medium 208. In one implementation, the client 206 may represent a hidden node to client 204, and vice versa. Various mechanisms or methods for signal exchanges are illustrated in FIGS. 3A-16 to highlight various features of embodiments of the STT system 200. Although described below in the context of the AP 202 or client 204 (or similarly client 206) sending or receiving various transmissions, it can be understood in the context of this disclosure that the effectuating of the various functionality of the STT system 200 is through the control logic 300 of each station (node). Further, the various interframe spaces (e.g., extended interframe space (EIFS), short interframe space (SIFS), etc.) described in 802.11 and understood by those having ordinary skill in the art are omitted from the various figures (and corresponding description) except where helpful to the understanding of the various embodiments.

Figure 3B:
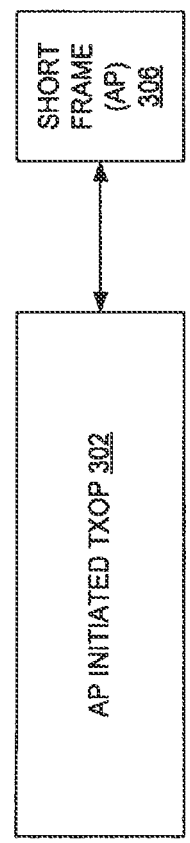

Before describing the various symmetrical TXOP truncation mechanisms of embodiments of the STT system 200, an embodiment of an STT system 200 that performs an AP-initiated TXOP is described in association with FIGS. 3A-3B. That is, FIGS. 3A-3B show one mechanism used by an embodiment of the STT system 200 to set a NAV and/or avoid EIFS for an AP-initiated TXOP. Referring to FIG. 3A, the AP 202 sets a NAV prior to a TXOP 302 by starting the TXOP 302 with a short frame 304 (e.g., short to reduce the probability of error) at a low basic rate. Note that blocks 302 and 304 collectively comprise a TXOP. The short frame 304 contains a duration value (e.g., the NAV setting) equal to the expected length of the TXOP 302. Referring to FIG. 3B, the AP 202 avoids any EIFS at the end of the TXOP 302 by sending a short frame 306 (typically containing a duration value of zero) at a low basic rate as the final frame of the TXOP 302. Note that blocks 302 and 306 collectively comprise a TXOP. In each case, the rate is selected such that frames from the AP 202 reach all nodes in the network (e.g., BSS).

Figure 4:
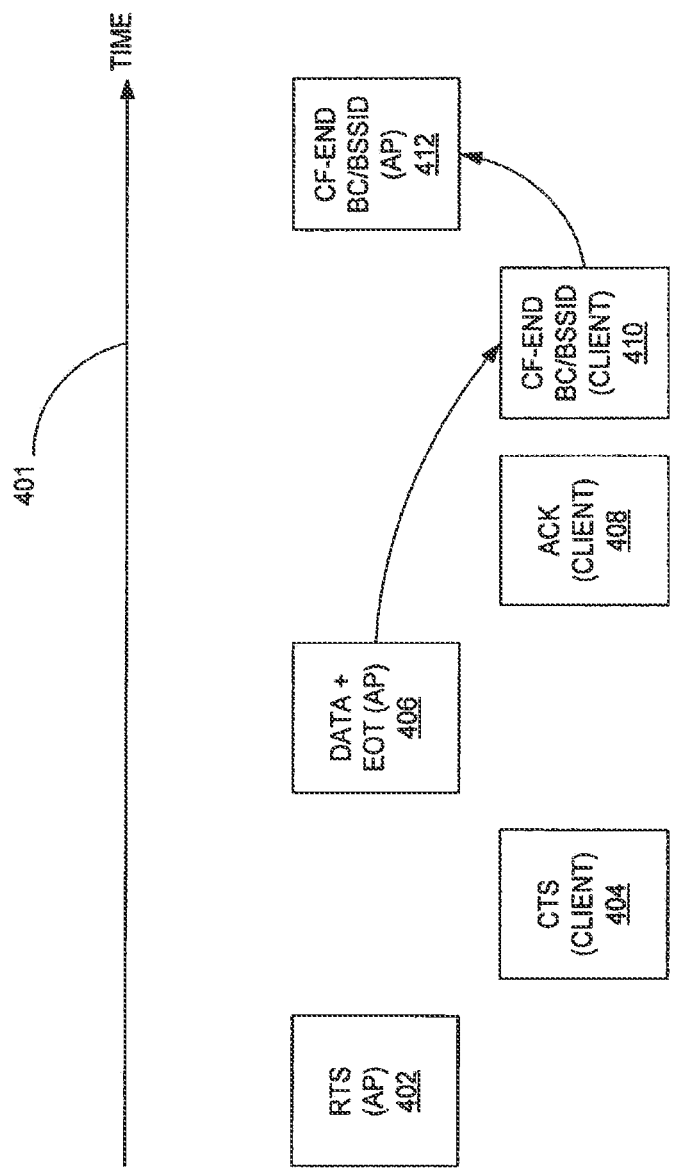
FIG. 4 is a block diagram that illustrates a mechanism employed by one embodiment of the STT system shown in FIG. 2 for an access point (AP) initiated TXOP where the AP signals the end of TXOP by setting an end of TXOP (EOT) indication on the final transmission to a client.

The description that follows and the associated figures (FIGS. 4-9) disclose various mechanisms employed (implemented) by certain embodiments of the STT system 200 that provide for symmetrical TXOP truncation using CF-end frames (herein, each of these frames also simply referred to as CF-end). In particular, various mechanisms of communication between devices of one or more STT system embodiments are illustrated in FIGS. 4-9 and explained in the corresponding text. For instance, shown in FIG. 4 are blocks representing respective frames that are passed between the client 204 and the AP 202 to provide for symmetrical TXOP truncation. As noted from FIGS. 4-9, the AP-sourced frames are represented with blocks in the top row (indicated in parenthesis, with "AP"), and the client-sourced frames are represented with blocks in the second row (as indicated in the parenthesis as "client"). The sequence of frame transmission advances in time from left to right, as represented by the arrow time line 401. For instance, for the exemplary communication shown in FIG. 4, an RTS frame sent by the AP 202 begins the sequence, and a CF-end sent by the AP 202 ends the sequence. Note that the first address (e.g., BC) is the receiver address, which should be the broadcast address so that the CF-end is received by all stations. The second address (e.g., BSSID) is usually the transmitter address, but in one or more embodiments described herein, comprises the unicast destination address.

In particular, the AP 202 (not shown, but implied as denoted by the "AP" in parenthesis) sends an RTS frame (or RTS) 402, and the client 204 (not shown, but implied as denoted by the "client" in parenthesis) responds by sending a CTS frame (or CTS) 404. The sending of the RTS 402 and CTS 404 results in the setting of a NAV around (e.g., close enough to decode frame transmissions all or at least most of the time) the respective devices. The AP 202 sends one or more data frames 406, each of which are acknowledged by the client 204 with an acknowledgement (ACK) frame 408. The final data frame 406 from the AP 202 to the client 204 is "tagged" with an end of TXOP (EOT) indication. This EOT indication comprises a signal or flag to the client 204 to respond with a CF-end frame 410 after a SIFS interval. In some implementations, the CF-end frame 410 may be preceded by a mandatory response frame, such as the ACK frame 408 (or a block acknowledgement (BA) frame, the latter not shown). A basic service set identifier (BSSID) field of the CF-end frame 410 carries a BSSID (e.g., MAC address) of the AP 202. The AP 202 recognizes its BSSID in the received CF-end frame 410 and responds to this CF-end frame 410 with a CF-end frame 412. By the AP 202 sending the CF-end frame 412, the TXOP is actively truncated by both devices 202 and 204.

Figure 5:
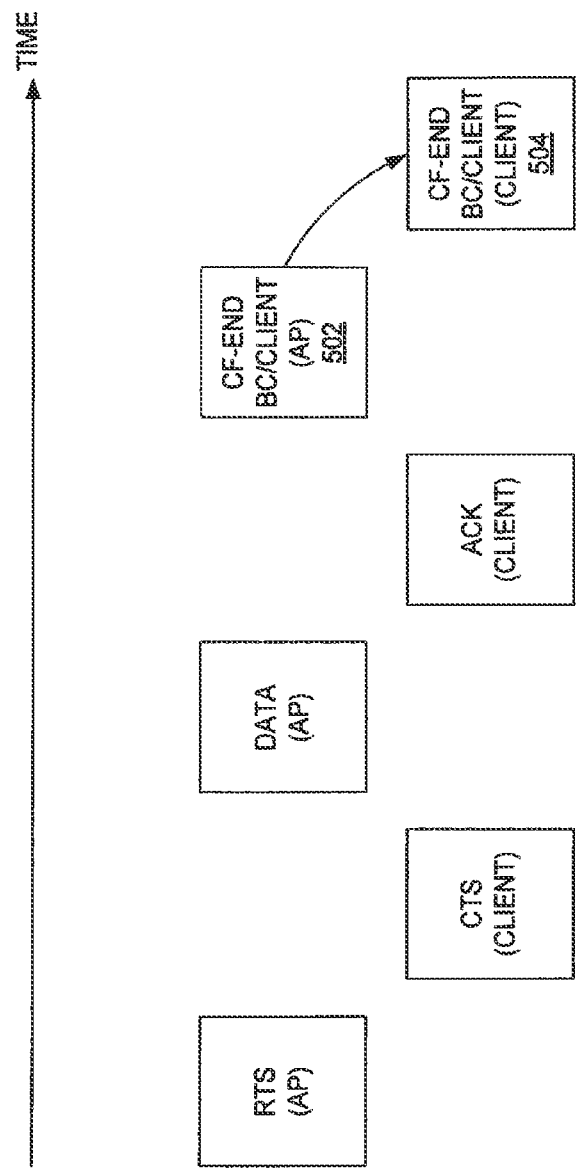
FIG. 5 is a block diagram that illustrates an alternative to the mechanism shown in FIG. 4 where the AP sends a CF-end with a client address, which is followed by a CF-end from the client with the same address of the client.

FIG. 5 illustrates an alternative to the mechanism shown in FIG. 4. That is, the final frame in the TXOP sent by the AP 202 is a CF-end frame 502 comprising the address (e.g., MAC address) of the client 204 inside the BSSID field. The client 204 recognizes its address in the CF-end frame 502 and responds after a SIFS interval with a CF-end frame 504. The CF-end frame 504 also comprises the client address inside the location of the BSSID field. This mechanism illustrated in FIG. 5 is referred to as a "CF-end to self."

Figure 6:
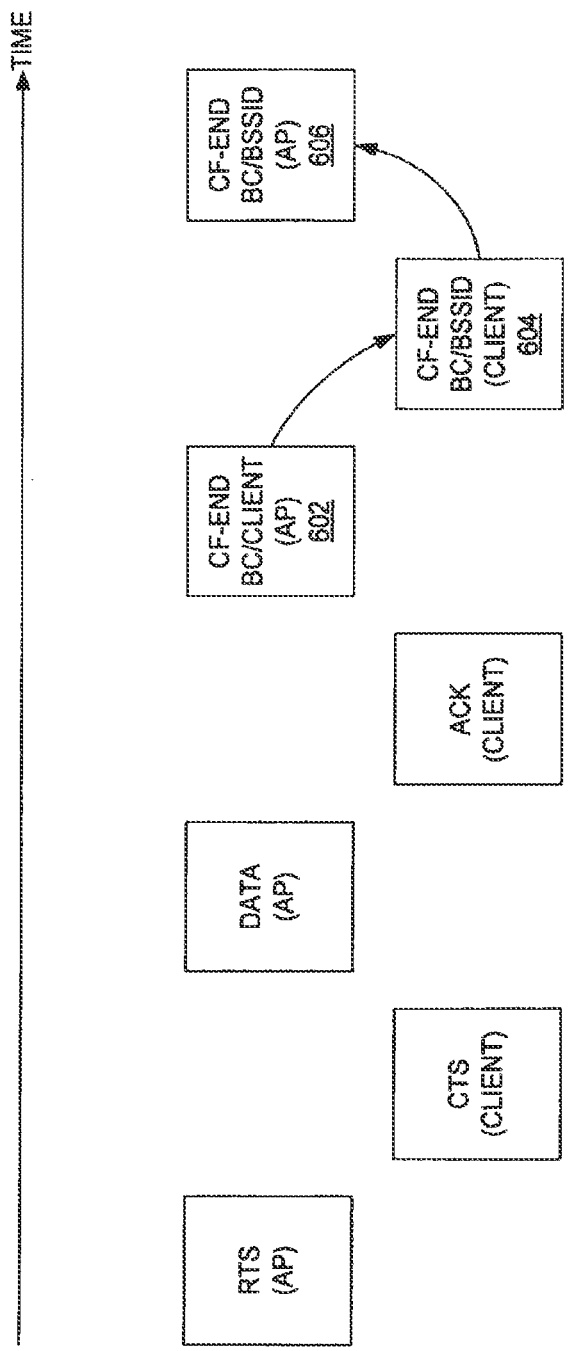
FIG. 6 is a block diagram that illustrates an alternative to the mechanism shown in FIG. 4 where the AP sends a CF-end with the client address in the location of a basic service set identifier (BSSID) field and the client responds with a CF-end with the BSSID and the AP responds with a final CF-end.

FIG. 6 illustrates an alternative to the mechanism shown in FIG. 4. The AP 202 sends a CF-end frame 602 with the client MAC address inside the BSSID field. The client responds with a CF-end frame 604 having the BSSID of the AP 202, to which the AP 202 responds with a CF-end frame 606 with the BSSID of the AP 202. Hence, the AP 202 acts as the final transmitter of the final CF-end frame, which may be desirable in relation to the EIFS inside a BSS since all associated clients receive the final CF-end frame (e.g., CF-end frame 606) from the AP 202. The first CF-end frame 602 uses a non-basic rate, and thereby functions similarly to the EOT frame indication (of final frame 406) shown in and described in association with FIG. 4. By using a non-basic rate for the first CF-end frame 602, NAV truncation functionality is absent. That is, a CF-end frame is effective for NAV truncation when sent at a basic rate that all clients inside a defined BSS can receive and decode.

Figure 7:
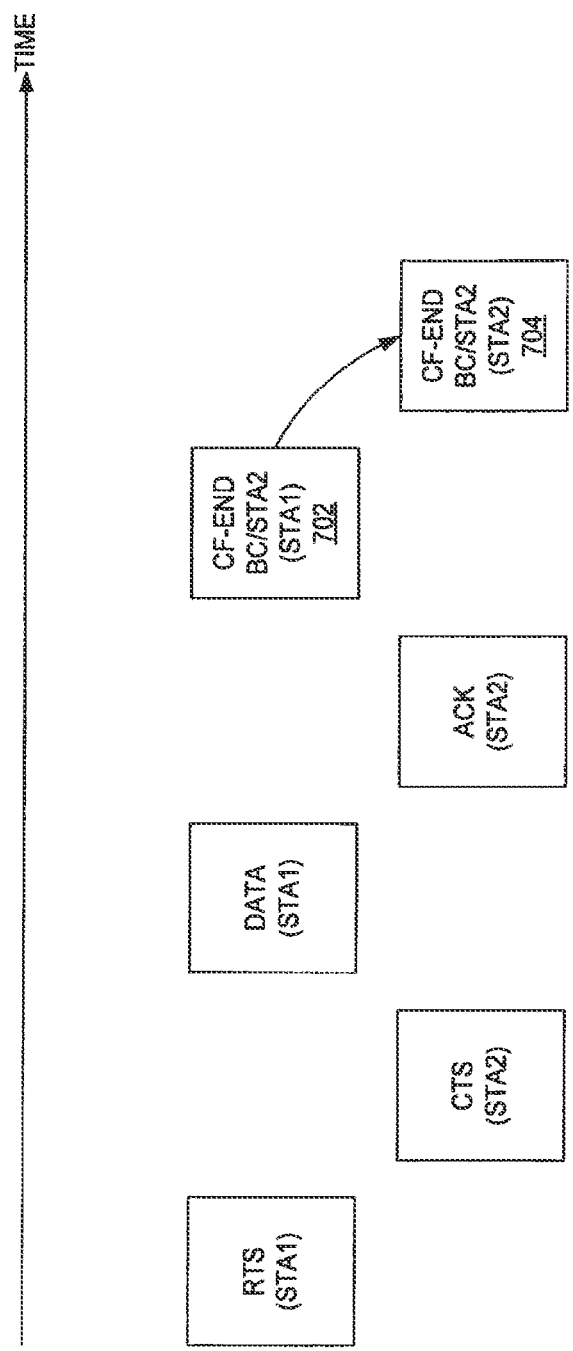
FIG. 7 is a block diagram that illustrates a mechanism employed by one embodiment of the STT system shown in FIG. 2 for a station-initiated TXOP that is terminated by a first station sending a CF-end with the address of the second station in the location of the BSSID field and the second station responding with a CF-end with the second station address in the BSSID field.
Figure 8:
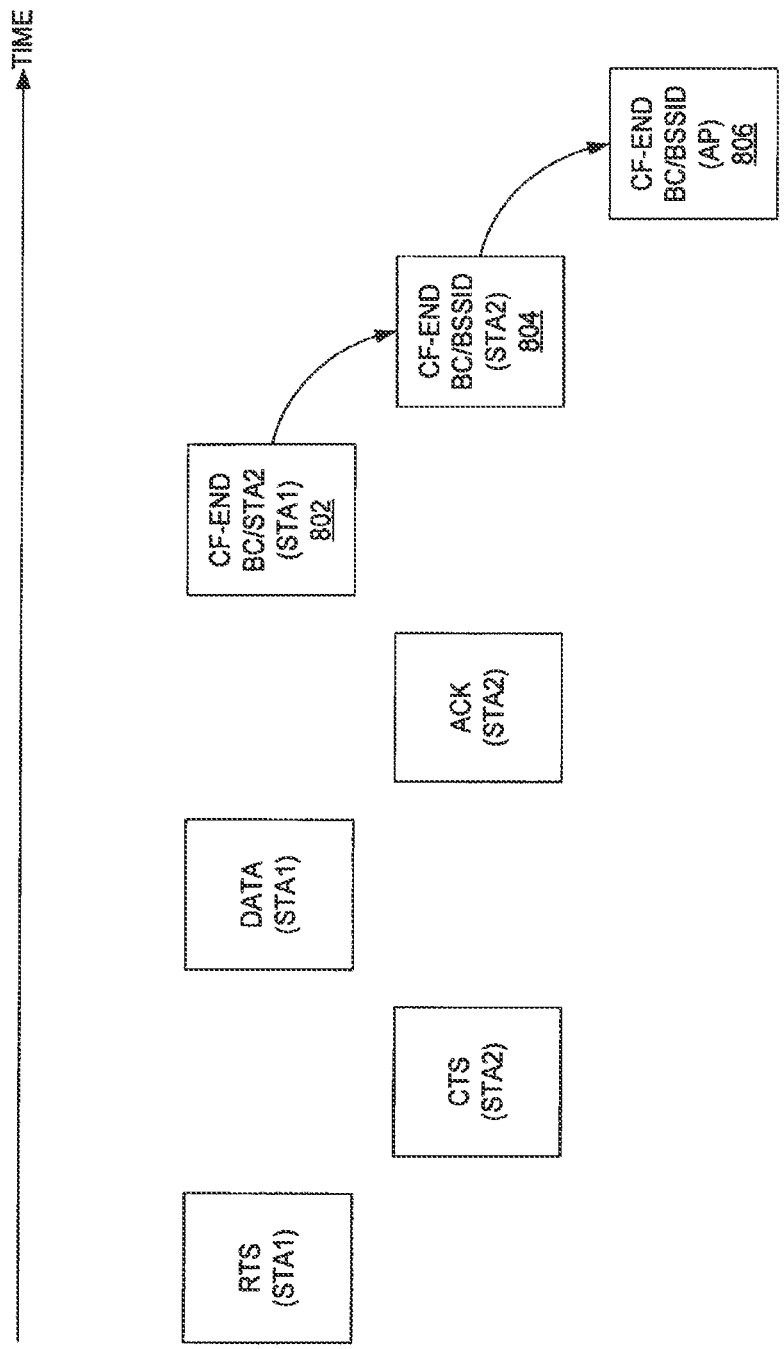
FIG. 8 is a block diagram that illustrates a mechanism employed by one embodiment of the STT system shown in FIG. 2 with a BSSID of a station which either transmitted the latest beacon in an independent basic service set (IBSS) or an AP in a Direct Link communication.
Figure 9:
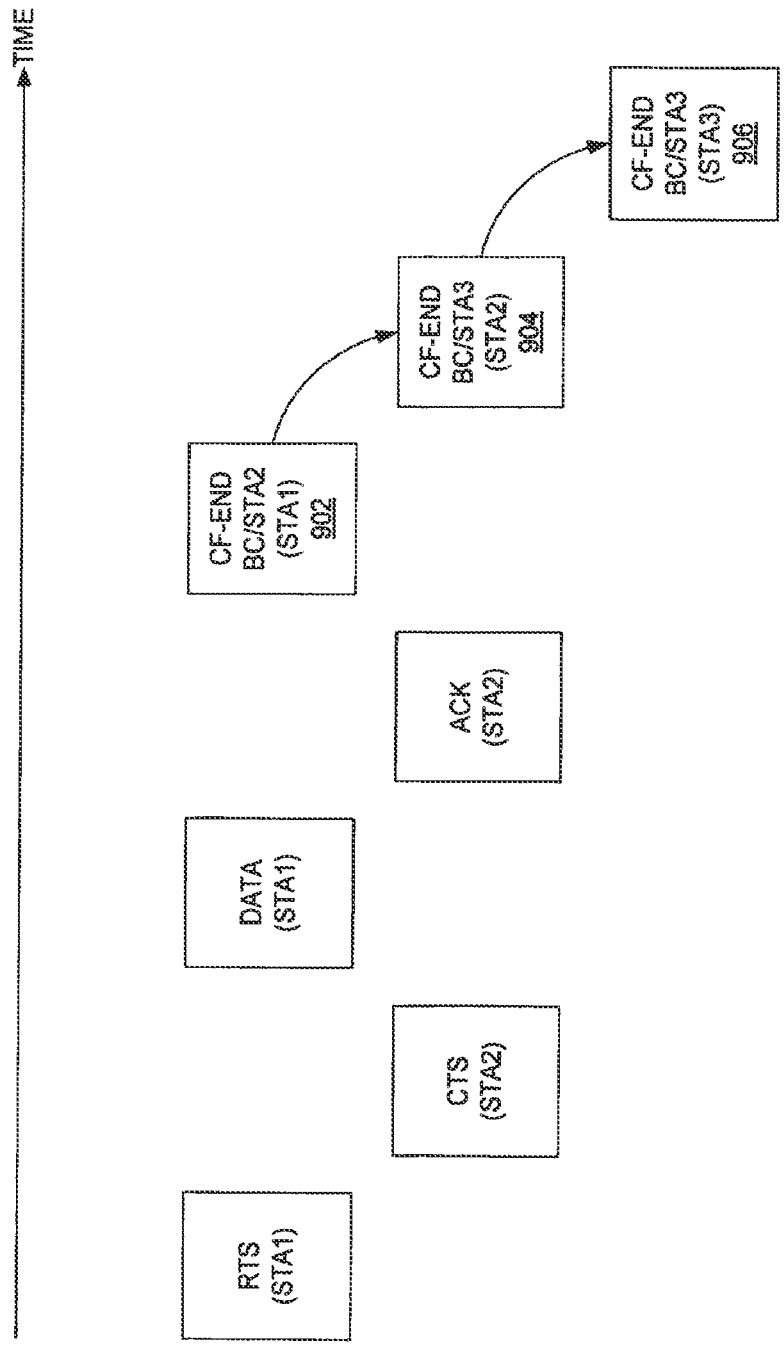
FIG. 9 is a block diagram that illustrates a mechanism employed by one embodiment of the STT system shown in FIG. 2 for a station-initiated TXOP that is terminated by a first station sending a CF-end to a second station, which responds with a CF-end to the third station, the latter which responds with a final CF-end.

Having described various exemplary mechanisms used by the STT system 200 for providing symmetrical truncation, the following description (and associated figures) generalizes some of the above-noted mechanisms for communications between stations (e.g., either AP 202 or clients 204, 206) and provides additional mechanisms. That is, FIGS. 7-9 provide a generalized illustration of the above-described mechanisms, in addition to describing additional mechanisms, by showing an exchange of frames between two stations, station 1 (STA1) (shown in a top row of FIGS. 7-9) and station 2 (STA2) (shown in a second row of FIGS. 7-9). In some embodiments, there may be an exchange of frames with a third station such as an AP or other device (shown in a third row at the bottom of FIGS. 8-9). The explanation of the various mechanisms shown in FIGS. 7-9 is directed to the exchange of frames that commence after the exchange of CTS/RTS frames and data and ACK frames, the latter of which have already been described above in association with FIGS. 4-6.

FIG. 7 illustrates a general principle of certain embodiments of the STT system 200 that any station that receives a CF-end frame 702 with its corresponding MAC address inside the location of the BSSID field responds to the CF-end frame 702 with a CF-end frame 704. The address used inside the CF-end frame 702 depends on the specific implementation. In general, if a CF-end frame 704 is required (a determination to be made by a client or an AP), the address of the transmitter of the next CF-end frame 704 is included inside the location of the BSSID field of CF-end frame 702. If no CF-end frame 704 (also referred to herein as a CF-end response frame) is required and the CF-end frame 702 is the final frame of the sequence, the station's (e.g., STA2) own address is included in the BSSID field, or the broadcast address (BC), or any other address which is not immediately associated with another station address. Such a scheme is applicable in an IBSS or Direct Link environment as well. In general, a client in infrastructure mode would typically include the BSSID of the AP, so that the AP generates a CF-end response. Further, a client in IBSS mode may include the MAC address of the peer node to which it is communicating during the TXOP. An AP may or may not include an address other than a BSSID of the AP.

Consider the case where STA1 comprises a client station 204, and STA2 comprises an AP station (or simply, AP) 202. The mechanism shown in FIG. 7 enables the AP 202 to respond to a CF-end 702, which contains a matching BSSID (e.g., MAC address) with another CF-end 704 after SIFS (which in some implementations, may be a PIFS interval). The CF-end 702 transmitted by the client station 204 comprises the final frame in the TXOP of client station 204, and in one embodiment, is an unacknowledged frame (hence, it is safe to transmit a CF-end 704 after SIFS). The BSSID makes the CF-end 702 specific to one AP, avoiding collisions between multiple APs transmitting a CF-end 704. The CF-end 704 clears the NAV around the AP 202, which covers the entire BSS. Note that some implementations may not require the CF-end 704. For instance, when the distance between the AP 202 and the client station 204 is small, a single CF-end from either the AP 202 or the client station 204 roughly resets the EIFS in the same coverage area, because the coverage areas for both devices largely overlap. The determination by the AP 202 to send a CF-end response (CF-end 704) can be based on the estimated distance of associated client stations 204, 206, and possibly in combination with the estimated distance of the transmitter of the CF-end. Such a determination can, for instance, be based on received signal strengths, or the PHY rates or modulation code schemes (MCSs) used to communicate with the client stations 204, 206. Other mechanisms may be used in the determination.

Continuing the case where STA1 is a client 204 and STA2 is an AP 202, the client 204 may send a CF-end 702 with a duration value (which sets a NAV) corresponding to a defined time after the expected CF-end 704 to be sent by the AP 202. The AP 202 sends a CF-end 704 (CF-end response) with a duration of zero, which causes receivers of each CF-end to resume backoff at exactly, or substantially exactly, the same time (and hence, in one embodiment, superceding existing rules that allow an EIFS to follow a CF-end). The client 204 may also send a CF-end 702 with a physical layer convergence protocol (PLCP) duration (which is signaled inside a SIG field or L-SIG field of the frame) equal to the CF-end itself plus SIFS plus the expected CF-end response duration from the AP 202. The AP 202, in one embodiment, is allowed to ignore this physical duration and respond with a CF-end 704 a SIFS interval after the end of the actual transmission of the CF-end 702, as can be determined from the indicated rate and size of the CF-end 702 (e.g., 20 octets without an HT control field, 24 octets with an HT control field). The CF-end 704, in one embodiment, comprises a regular PLCP duration. The mechanisms described below in association with FIGS. 14 and 15 address situations where there is a difference in when the NAV gets reset and backoff resumes.

In some embodiments, a third CF-end frame may be added to the frame sequence illustrated in FIG. 7 when the second station includes the BSSID. Such a situation is illustrated in FIG. 8, which includes the addition of an AP (implicitly represented by the bottom or third row frame 802). The TXOP is initiated by STA1 sending a CF-end frame 802 to STA2, which responds with a CF-end frame 804 to the AP. As shown, the AP responds with a final CF-end frame 806 with the BSSID inside the BSSID field of CF-end frame 806.

In an IBSS implementation, the BSSID may be recognized by the station that transmitted the final IBSS beacon, as illustrated in FIG. 9. As shown, STA1 sends a CF-end frame 902 addressed at STA2. STA2 responds with a CF-end frame 904 addressed at the BSSID of STA2. STA3 responds with a CF-end frame 906. The BSSID can be the address of the station (e.g., STA3) that transmitted the latest beacon in an IBSS, or it can be the address of the AP in case the communication between STA1 and STA2 comprises a Direct Link communication.

In some embodiments, the receiver address (RA) of a CF-end frame is equal to the broadcast address, which ensures that all stations within range receive the CF-end frame and process the same. The location of the BSSID can be used to indicate the destination of the CF-end. Further, in some embodiments, the recognition of the CF-end type/subtype is enough for a receiver to truncate the NAV. In such implementations, the RA of the CF-end frame can be used to store the CF-end responder address, while the BSSID field can be used to store the BSSID.

Figure 10:
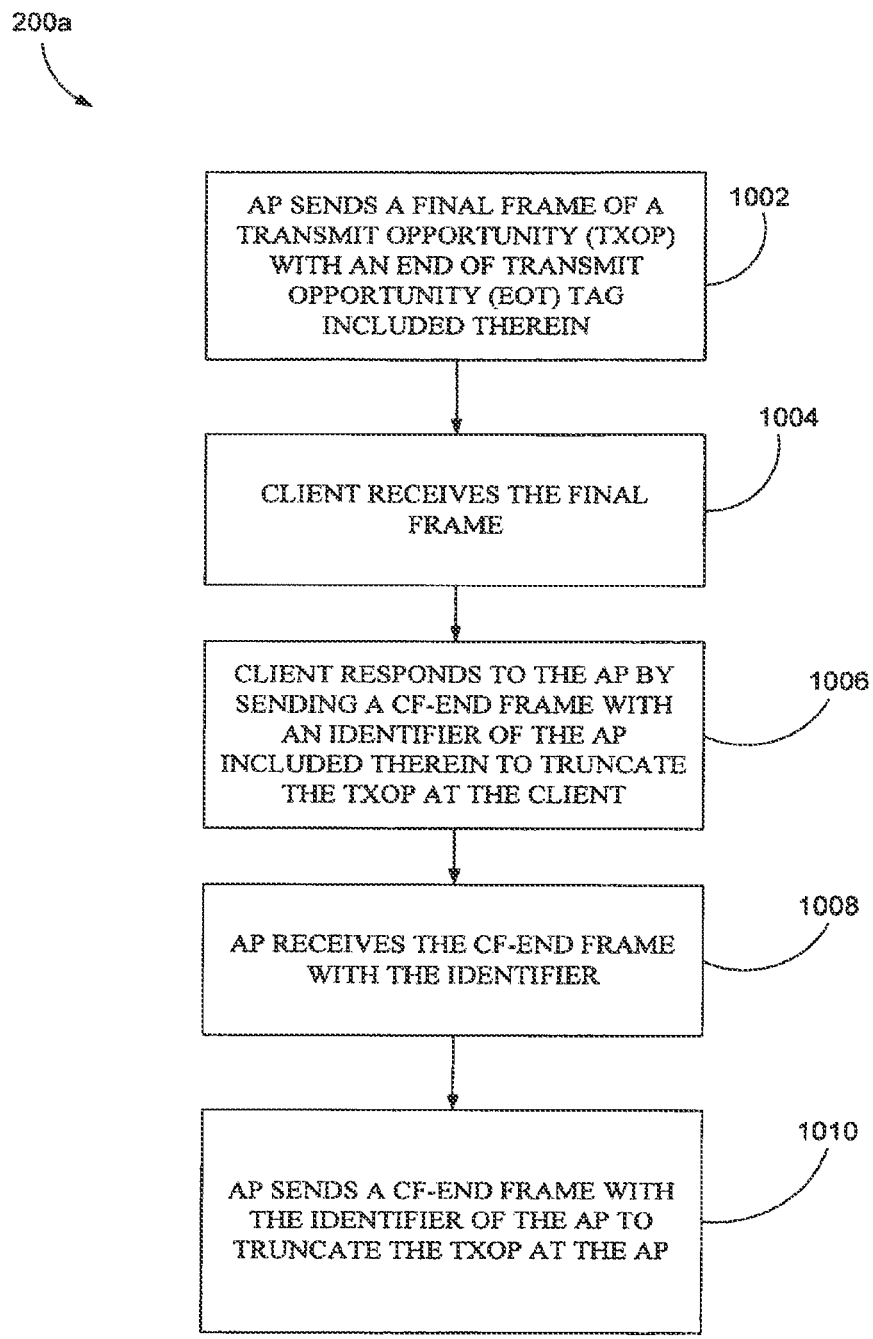
FIG. 10 is a flow diagram that illustrates a method embodiment corresponding to the mechanism shown in FIG. 4.

Having described various embodiments of the STT system 200 above, it can be appreciated in the context of this disclosure that one method embodiment, referred to as STT method 200a corresponding to the mechanism shown in FIG. 4 and shown in the flow diagram of FIG. 10, comprises sending by an AP a final data frame of a transmit opportunity (TXOP) with an end of transmit opportunity (EOT) indicator included therein (1002), receiving by a client the final data frame (1004), the client responding by sending a CF-end frame, with an identifier (e.g., MAC address, etc.) of the AP included therein, to the AP to truncate the TXOP around the client (1006), the AP receiving the CF-end frame with the identifier (1008), and the AP sending a CF-end frame with the same identifier to the client to truncate the TXOP around the AP (1010).

It can be appreciated that portions of the method embodiment 200a are implemented at each device, and hence such portions can be described from the perspective of the individual devices of the system 200. For instance, one method embodiment corresponding to method 200a, viewed from the perspective of an AP, comprises sending (by an AP) a final data frame of a transmit opportunity (TXOP) with an end of transmit opportunity (EOT) indicator included therein, and responsive to receiving a CF-end frame with an identifier of the AP included therein to truncate the TXOP around the client, sending a CF-end frame with the same identifier to the client to truncate the TXOP around the AP.

Another method embodiment corresponding to method 200a, from the perspective of a client, comprises receiving (by a client) a final frame of a transmit opportunity (TXOP) from an AP, the final data frame having an end of transmit opportunity (EOT) indicator included therein, responding to the final frame by sending a CF-end frame, with an identifier of the AP included therein, to the AP to truncate the TXOP around the client and to prompt the AP to send a CF-end frame to truncate the TXOP around the AP.

Figure 11:
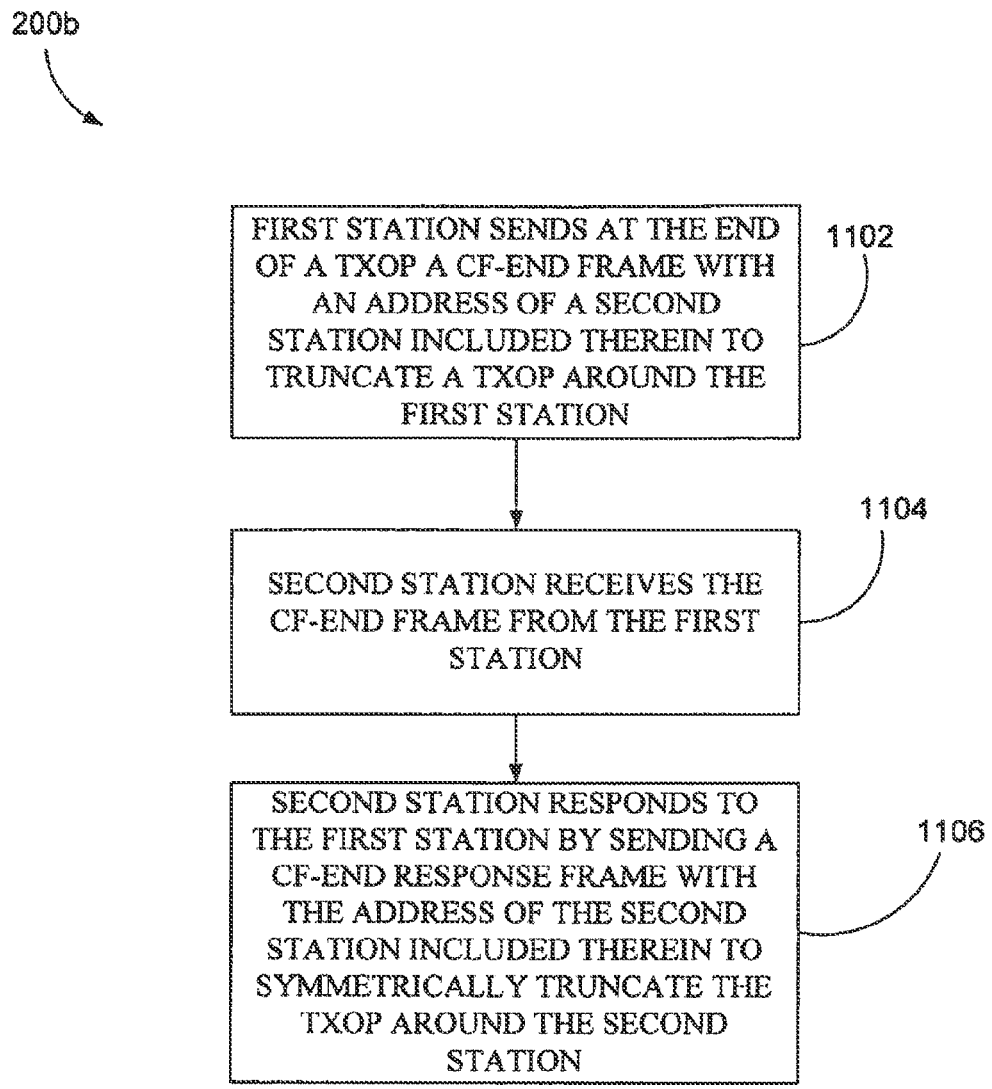
FIG. 11 is a flow diagram that illustrates a method embodiment corresponding to the mechanisms shown in FIGS. 5 and 7.

Another embodiment, referred to as STT method 200b corresponding to the mechanisms illustrated in FIGS. 5 and 7 and shown in the flow diagram of FIG. 11, comprises sending, by a first station (e.g., an AP), at the end of a TXOP a CF-end frame with an address of a second station (e.g., a client) included therein to truncate a TXOP around the first station (1102), receiving by the second station the CF-end frame from the first station (1104), the second station responding to the first station by sending a CF-end frame with the address of the second station included therein to truncate the TXOP around the second station (1106).

It can be appreciated that portions of the method embodiment 200b are implemented at each device (e.g., stations, whether configured as an AP or client), and hence such portions can be described from the perspective of the individual devices of the system 200. For instance, one method embodiment corresponding to method 200b implemented at a first station (e.g., AP) comprises receiving a final frame of a TXOP from a second station (e.g., client) at the first station, and responsive to receiving the final frame of the TXOP, sending, at the end of the TXOP, a CF-end frame with an address of the second station included therein to truncate a TXOP around the first station and to prompt the second station to send a CF-end frame to truncate the TXOP around the second station.

Additionally, one method embodiment corresponding to method 200b implemented at a second station (e.g., client) comprises receiving (at the second station) a CF-end frame with an address of the second station included therein, the CF-end used to truncate a TXOP around a first station (e.g., AP), and responding to the first station by sending a CF-end frame with the address of the second station included therein to truncate the TXOP around the second station.

Figure 12:
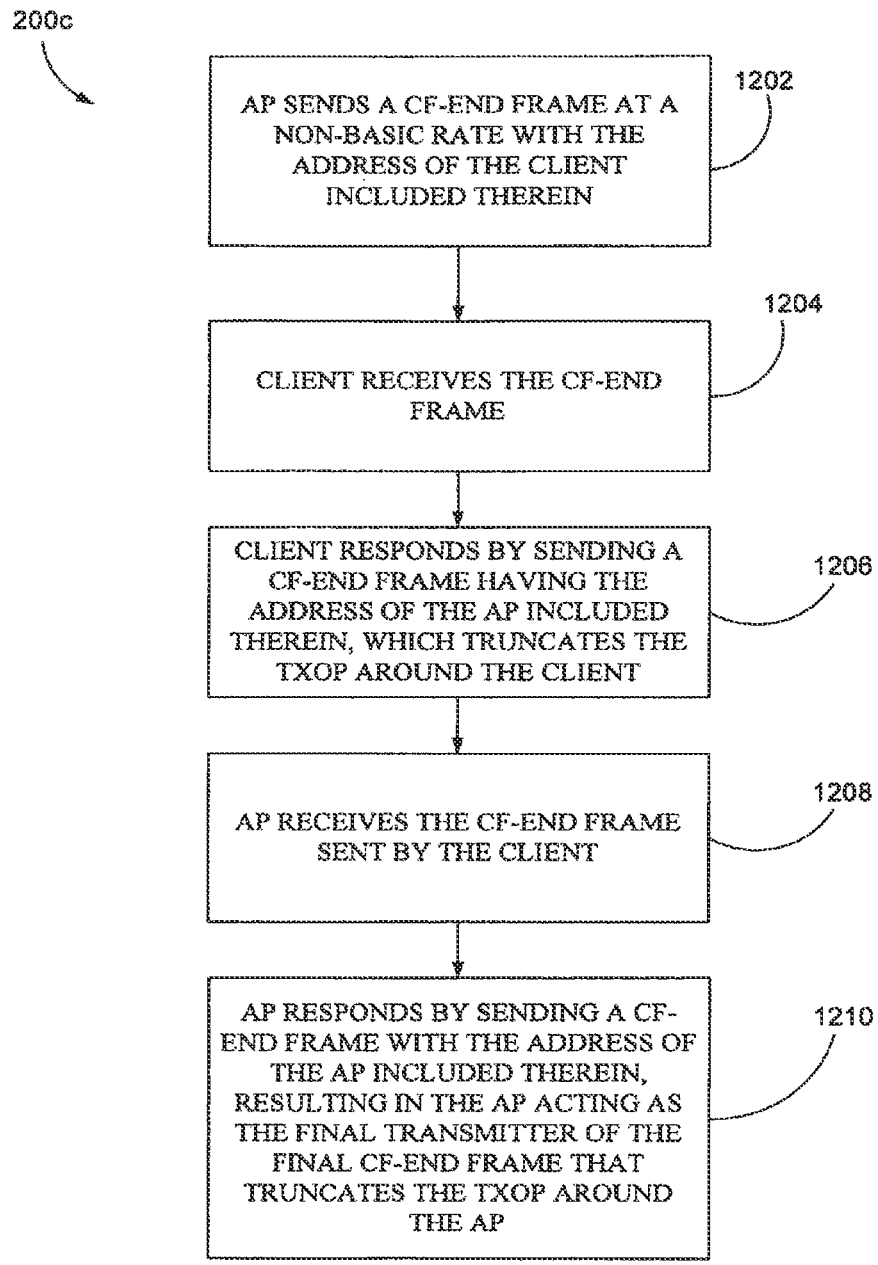
FIG. 12 is a flow diagram that illustrates a method embodiment corresponding to the mechanisms shown in FIG. 6.

Another method embodiment, referred to as STT method 200c corresponding to the mechanism illustrated in FIG. 6 and shown in the flow diagram of FIG. 12, comprises an AP sending a CF-end frame at a non-basic rate (and hence acting as an EOT indicator) with the address of the client included therein (1202), the client receiving the CF-end frame (1204), the client responding by sending a CF-end frame having the address of the AP included therein, which truncates the TXOP around the client (1206), the AP receiving the CF-end frame sent by the client (1208), and the AP responding by sending a CF-end frame with the address of the AP included therein, resulting in the AP acting as the final transmitter of the final CF-end frame that truncates the TXOP around the AP (1210).

It can be appreciated that portions of the method embodiment 200c are implemented at each device, and hence method embodiments can be described from the perspective of the AP and client. One method embodiment corresponding to method 200c implemented at an AP comprises an AP sending a CF-end frame at a non-basic rate (and hence acting as an EOT indicator) with the address of the client included therein, and responsive to receiving a client-TXOP truncating CF-end frame having the address of the AP included therein, responding by sending a CF-end frame with the address of the AP included therein, which truncates the TXOP around the AP.

Additionally, one method embodiment corresponding to method 200c implemented at a client comprises receiving by a client a CF-end frame possibly at a non-basic rate (and hence acting as an EOT indicator) with the address of the client included therein, and responding by sending a CF-end frame having the address of the sending AP included therein, which truncates the TXOP around the client and prompts the AP to send a final CF-end frame that truncates the TXOP around the AP.

Figure 13:
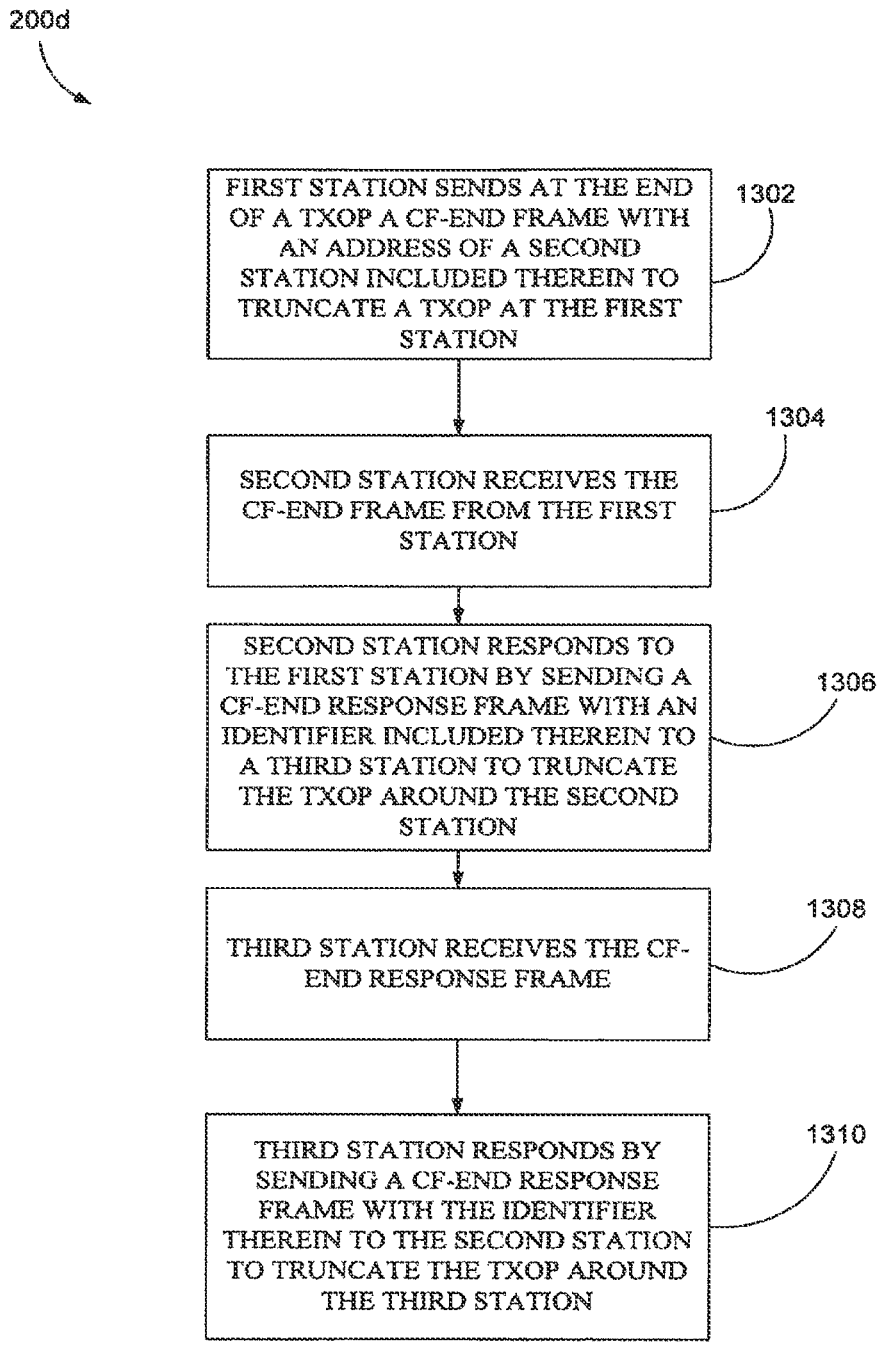
FIG. 13 is a flow diagram that illustrates a method embodiment corresponding to the mechanisms shown in FIGS. 8-9.

Another method embodiment, referred to as STT method 200d corresponding to the mechanisms illustrated in FIGS. 8-9 and shown in the flow diagram of FIG. 13, comprises sending, by a first station, at the end of a TXOP a CF-end frame with an address of a second station included therein to truncate a TXOP around the first station (1302), receiving by the second station the CF-end frame from the first station (1304), the second station responding to the first station by sending a CF-end frame with an identifier included therein to a third station to truncate the TXOP around the second station (1306), the third station receiving the CF-end response frame (1308), the third station responding by sending a CF-end response frame with the identifier therein to the second station to truncate the TXOP around the third station (1310).

It can be appreciated by one having ordinary skill in the art, in the context of this disclosure, that each device participating in the methodology illustrated in FIG. 13 performs portions of the described method 200d that can be described similarly to the manner such perspective-based methods have been described previously in FIGS. 10-12, and thus omitted here for brevity.

Figure 14:
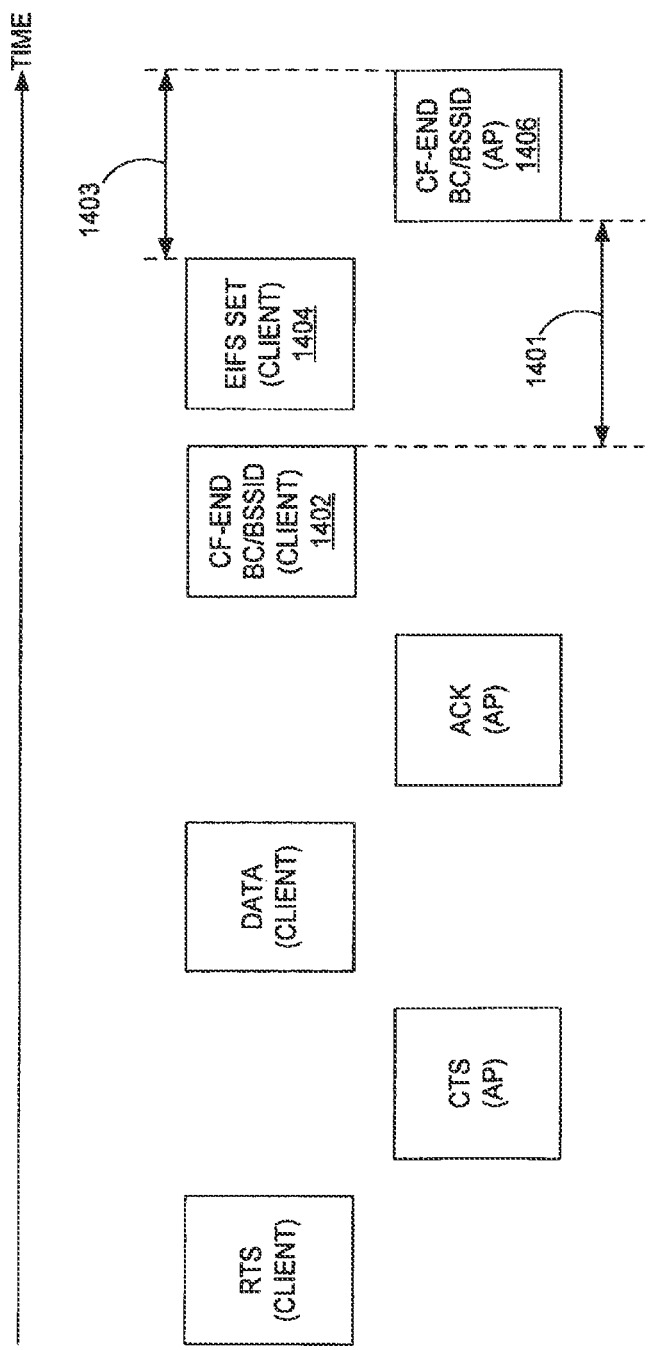
FIG. 14 is a block diagram that illustrates a NAV reset mechanism employed by an embodiment of the STT system shown in FIG. 2.

FIG. 14 illustrates various mechanisms for client-initiated TXOPs for embodiments of the STT system 200, and in particular, mechanisms that focus on issues of NAV reset and backoff resumption involving CF-end frames or frames acting in particular circumstances with similar functionality to CF-end frames. The description that follows is based in part on the previous discussion corresponding to FIG. 7 for the case where STA1 is a client and STA2 is an AP. To solve the difference in when a NAV gets reset and the backoff resumes, the client may transmit a short frame (EIFS set frame) 1404 with a defined frame check sequence (FCS) field 110 (FIG. 1), which is not the correct FCS (e.g., if the FCS is correct, then stations start an EIFS rather than a DCF Interframe Space/Arbitration Interframe Space or DIFS/AIFS), at a SIFS time after the CF-end frame 1402. The transmission of this short frame 1404 in the manner as described above causes receivers (e.g., clients 204, 206) to start an EIFS. The AP 202 delays (e.g., by SIFS+EIFS set frame+EIFS-DIFS-CF-end frame, represented by duration interval 1401) the sending of the CF-end frame 1406 so that the transmission of frame 1406 finishes exactly (or substantially so) when the EIFS-DIFS finishes (the EIFS-DIFS represented by the duration interval denoted by 1403), so that either client (e.g., 204, 206) starts DIFS (or more general, AIFS) at the same time. The DIFS refers to a first fixed part of the DCF backoff (DIFS), and the AIFS refers to the EDCA backoff (AIFS). As is known, EDCA is similar to DCF but with QoS differentiation (802.11e). The AP 202 does not start an EIFS and ignores the intermediate EIFS set frame 1404. Thus, the EIFS set frame 1404 causes AIFS to start for clients 204, 206 that cannot receive the CF-end 1406 from the AP 202. The CF-end frame 1406 from the AP 102 is transmitted during this time, such that all nodes start DIFS (or AIFS) at the same time. Note that in some embodiments, the EIFS set frame 1404 can be a zero length frame (e.g., a preamble without a MAC payload).

Figure 15:
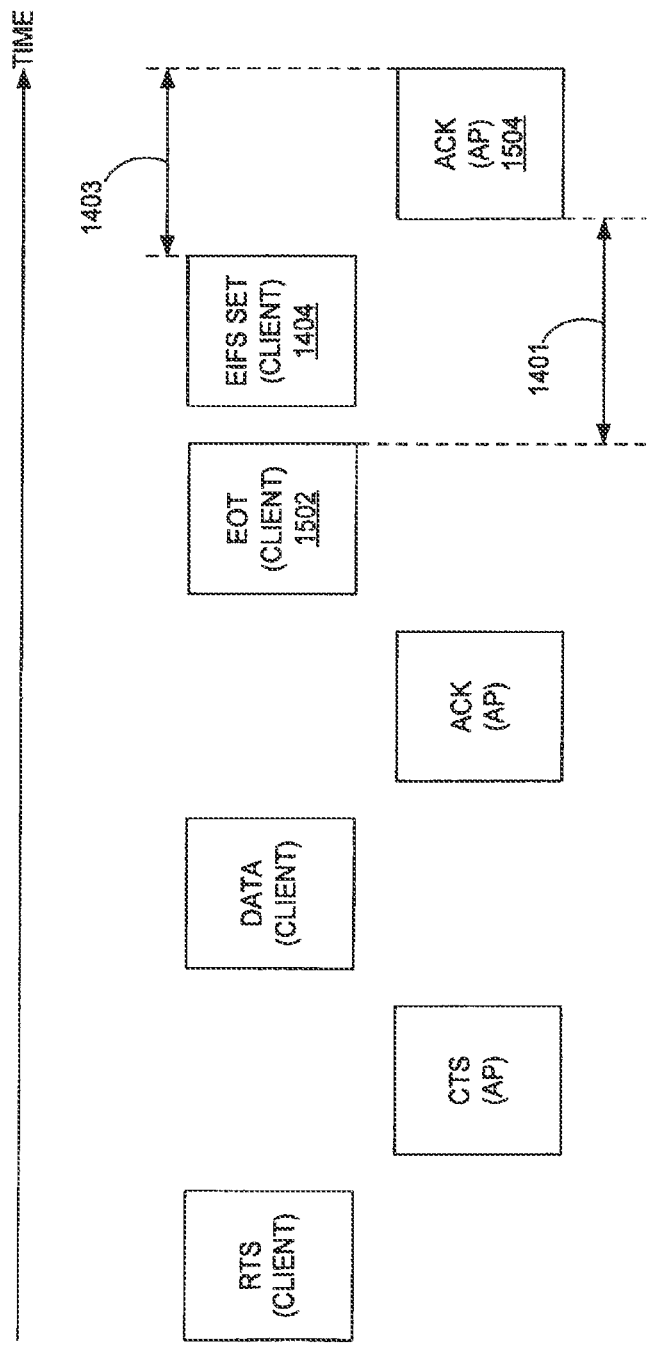
FIG. 15 is a block diagram that illustrates an alternative to the NAV reset mechanism shown in FIG. 14 without using CF-end frames.

FIG. 15 is a block diagram that illustrates the principles of the mechanism shown in FIG. 14, without the use of CF-end frames. In other words, the CF-end frame 1402 of FIG. 14 is replaced with an EOT frame 1502, and the CF-end frame 1406 of FIG. 14 is replaced with an ACK frame 1504. The mechanism illustrated in FIG. 15 can be used to resume the backoff for all nodes within the range of either the client 204 or the AP 202 or both in the network at the same time (e.g., without part of the nodes having to wait for an EIFS to finish). The EOT frame 1502 is sent to the AP 202, followed after an SIFS interval by the EIFS set frame 1404. The AP 202, through a similar delay 1401 and similar manner to the mechanism described in association with FIG. 14, responds to the EOT frame 1502 (and ignores the EIFS set frame 1404) with the ACK frame 1504. The ACK frame 1504 ends at the same time as the interval 1403 after the end of the EIFS set frame 1404. Note that in some embodiments, both the AP and the client can start an EIFS set frame at the same, or substantially same, time.

Figure 16:
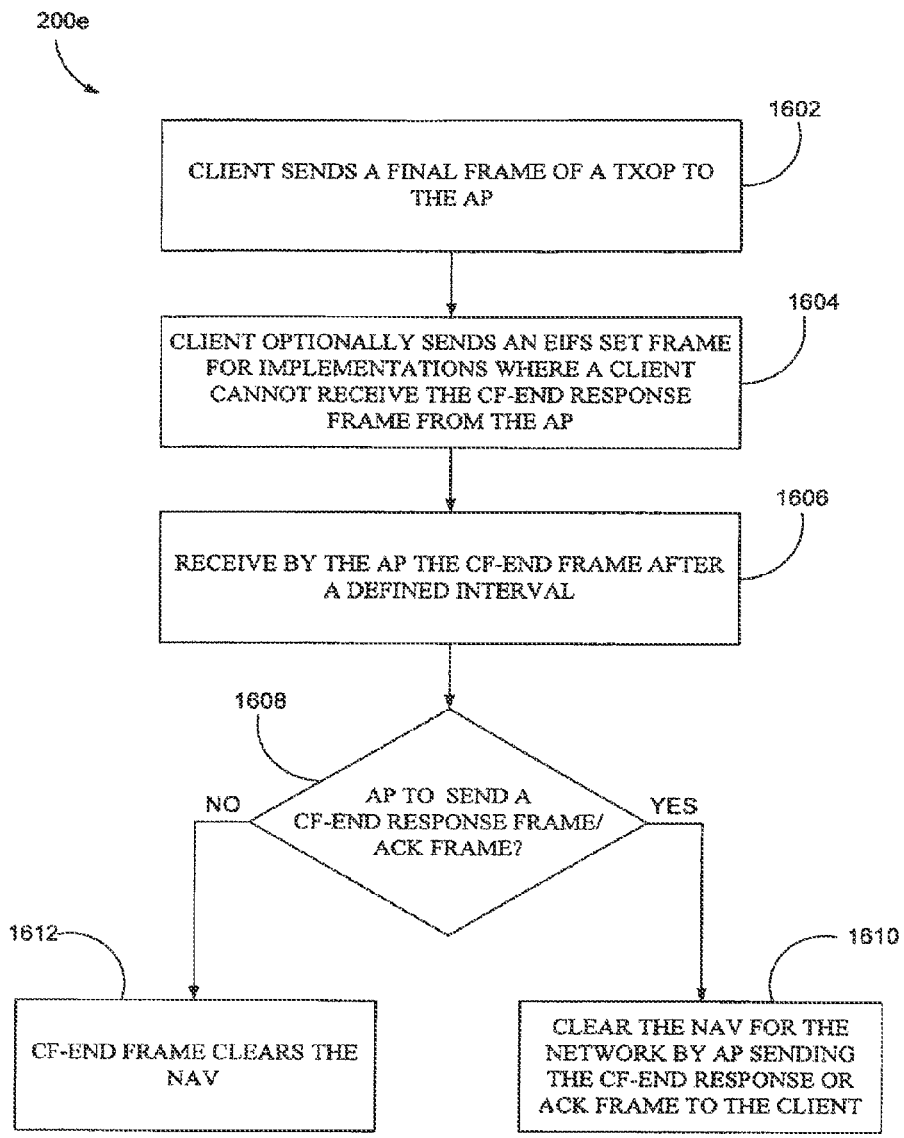
FIG. 16 provides a flow diagram that illustrates a method embodiment corresponding to the NAV reset mechanisms shown in FIGS. 14-15.

Having described the various mechanisms shown in FIGS. 14-15, one method embodiment of the STT system 200 encompassing these mechanisms, the method referred to as 200e and shown in FIG. 16, comprises the client 204 sending a final data frame of a TXOP to the AP 202 (1602), the final frame having the form of a CF-end frame specific to a given AP or an EOT frame, sending an EIFS set frame (1604), receiving by the AP 202 the CF-end frame after a defined interval (the defined interval being a SIFS, a PIFS, or duration 1401 described in association with FIG. 14) (1606), and responsive to deciding to send the CF-end response frame or ACK frame, clearing the NAV for the network (e.g., BSS) by sending the CF-end response frame or ACK frame to the client 204 (1610). Responsive to deciding not to send the CF-end response frame, the CF-end frame acts to clear the NAV (1612), as described above.

It can be appreciated by one having ordinary skill in the art, in the context of this disclosure, that each device participating in the methodology illustrated in FIG. 16 performs portions of the described method 200e that can be described similarly to the manner such perspective-based methods have been described previously in FIGS. 10-12, and thus omitted here for brevity.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as should be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A symmetric transmit opportunity (TXOP) truncation method comprising:

receiving a frame from an access point (AP) that includes an indicator of an end of a TXOP; and responsive to receiving the indicator, sending to the AP a first frame that truncates the TXOP around a first station, wherein the AP responds to receipt of the first frame by sending a second frame that truncates the TXOP around the AP.

2. The method of claim 1, wherein receiving the frame comprises receiving a data frame.

3. The method of claim 1, further comprising sending an acknowledgement (ACK) frame before sending the first frame to the AP.

4. The method of claim 1, wherein sending the first frame and sending the second frame comprises sending the first frame and the second frame with an address of the AP.

5. The method of claim 4, wherein the address of the AP comprises an address in the BSSID field of the first or second frame.

6. The method of claim 1, wherein the first frame is sent at a non-basic rate, and the second frame is sent at a basic rate.

7. A client device comprising:
a client receiver configured to receive a frame from an access point (AP) that includes an indicator of an end of a TXOP; and
a client transmitter configured to, in response to receiving the indicator, send a first frame that truncates the TXOP around the client device, wherein the AP responds to receipt of the first frame by sending a second frame that truncates the TXOP around the AP.

8. The client device of claim 7, wherein the client receiver is configured to receive a data frame.

9. The client device of claim 7, wherein the client receiver is further configured to send an acknowledgement (ACK) frame before sending the first frame to the AP.

10. The client device of claim 7, wherein the client transmitter is configured to send the first frame and the second frame with an address of the AP.

11. The client device of claim 10, wherein the address of the AP comprises an address in the BSSID field of the first or second frame.

12. The client device of claim 7, wherein the first frame is sent at a non-basic rate, and the second frame is sent at a basic rate.

13. The client device of claim 7, wherein the first frame is a CF-end frame.

14. A non-transitory, computer-readable medium having instructions stored there-on for performing a symmetric transmit opportunity (TXOP) truncation between a first station and a second station, the instructions comprising:
instructions for receiving a frame from an access point (AP) that includes an indicator of an end of a TXOP; and
instructions for, responsive to receiving the indicator, sending to the AP a first frame that truncates the TXOP around a first station, wherein the AP responds to receipt of the first frame by sending a second frame that truncates the TXOP around the AP.

15. The computer-readable medium of claim 14, wherein receiving the frame comprises receiving a data frame.

16. The computer-readable medium of claim 14, further comprising sending an acknowledgement (ACK) frame before sending the first frame to the AP.

17. The computer-readable medium of claim 14, wherein sending the first frame and sending the second frame comprises sending the first frame and the second frame with an address of the AP.

18. The computer-readable medium of claim 17, wherein the address of the AP comprises an address in the BSSID field of the first or second frame.

19. The computer-readable medium of claim 14, wherein the first frame is sent at a non-basic rate, and the second frame is sent at a basic rate.

20. The computer-readable medium of claim 14, wherein the first frame is a CF-end frame.

* * * * *

UNITED STATES PATENT AND TRADEMARK OFFICE
CERTIFICATE OF CORRECTION

PATENT NO. : 8,488,550 B2  
APPLICATION NO. : 13/591654  
DATED : July 16, 2013  
INVENTOR(S) : Wentink Page 1 of 1

It is certified that error appears in the above-identified patent and that said Letters Patent is hereby corrected as shown below:

On the title page, in item (75), under "Inventor", in Column 1, Line 1, delete "Ultrecht (NL)" and insert -- Utrecht (NL) --, therefor.

In the Specifications

In Column 8, Line 62, delete "superceding" and insert -- superseding --, therefor.

Signed and Sealed this  
First Day of April, 2014

Michelle K. Lee  
*Deputy Director of the United States Patent and Trademark Office*